(12) United States Patent
Musunuri et al.

(10) Patent No.: US 8,102,470 B2
(45) Date of Patent: Jan. 24, 2012

(54) VIDEO SYNCHRONIZATION SYSTEM

(75) Inventors: Chowdhary Musunuri, San Jose, CA (US); Richard T. Wales, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1007 days.

(21) Appl. No.: 12/035,637

(22) Filed: Feb. 22, 2008

(65) Prior Publication Data

US 2009/0213267 A1    Aug. 27, 2009

(51) Int. Cl.
*H04N 5/06* (2006.01)
*H03L 7/00* (2006.01)

(52) U.S. Cl. .................. 348/521; 348/540; 348/547

(58) Field of Classification Search .......... 348/516, 348/521, 522, 536, 540, 547
See application file for complete search history.

(56) References Cited

U.S. PATENT DOCUMENTS

| | | | |
|---|---|---|---|
| 4,018,990 A | 4/1977 | Long et al. .................. 358/149 |
| 4,038,683 A | 7/1977 | Thorpe et al. ............... 358/19 |
| 4,091,422 A | 5/1978 | Amster | |
| 4,490,741 A | 12/1984 | Hornback .................. 358/152 |
| 4,498,103 A | 2/1985 | Aschwanden ............. 358/148 |
| 4,568,976 A | 2/1986 | Trammell ................. 358/148 |
| 4,583,119 A | 4/1986 | Roscoe .................... 358/148 |
| 4,609,947 A | 9/1986 | Yamagiwa et al. ......... 358/310 |
| 4,639,780 A | 1/1987 | Willis ..................... 358/150 |
| 4,697,207 A | 9/1987 | Lilley ...................... 358/17 |
| 4,751,565 A | 6/1988 | Emmons et al. ............ 358/19 |
| 4,768,083 A | 8/1988 | Romesburg ............... 358/22 |
| 5,155,595 A | 10/1992 | Robison .................. 358/149 |
| 5,185,603 A | 2/1993 | Medin .................... 340/814 |
| 5,193,000 A | 3/1993 | Lipton et al. | |
| 5,367,338 A | 11/1994 | Rothermel et al. .......... 348/538 |
| 5,440,593 A | 8/1995 | Leone ..................... 375/354 |
| 5,517,253 A | 5/1996 | De Lange ................. 348/513 |

(Continued)

FOREIGN PATENT DOCUMENTS

EP    1 450 555    8/2004

(Continued)

OTHER PUBLICATIONS

PCT, "Notification of Transmittal of the International Search Report and the Written Opinion of the International Searching Authority, or the Declaration," International Application No. PCT/US2009/034598, May 27, 2009, 17 pages.

(Continued)

*Primary Examiner* — Yemane Mesfin
(74) *Attorney, Agent, or Firm* — Baker Botts L.L.P.

(57) ABSTRACT

In one embodiment, a method for synchronizing a plurality of video signals received from one or more video sources is provided. The method includes providing one or more video sources and providing a codec including an internal reference oscillator. The method also includes generating a plurality of horizontal and vertical synchronization pulses based on the reference frequency of the internal reference oscillator, generating a composite synchronization pulse based on the plurality of horizontal and vertical synchronization pulses, and transmitting the composite synchronization pulse to the one or more video sources via a communication link. The method further includes separating the composite synchronization pulse back into the plurality of horizontal and vertical synchronization pulses, generating a pixel clock signal for the one or more video sources based on one or more of the plurality of horizontal and vertical synchronization pulses, and genlocking the one or more video sources based on the generated clock signal.

20 Claims, 2 Drawing Sheets

U.S. PATENT DOCUMENTS

| | | | |
|---|---|---|---|
| 5,717,469 A | 2/1998 | Jennes et al. | 348/571 |
| 5,748,252 A | 5/1998 | Draves | 348/516 |
| 5,801,789 A | 9/1998 | Zeidler et al. | 348/589 |
| 5,835,155 A | 11/1998 | Jennes et al. | 348/536 |
| 5,870,139 A | 2/1999 | Cooper et al. | 348/159 |
| 5,973,758 A | 10/1999 | Soroushian et al. | 348/845.2 |
| 5,995,140 A | 11/1999 | Cooper et al. | 348/159 |
| 6,008,858 A | 12/1999 | Swan et al. | 348/523 |
| 6,072,503 A | 6/2000 | Tani et al. | 345/473 |
| 6,493,034 B1 * | 12/2002 | Elberbaum | 348/512 |
| 6,507,370 B1 | 1/2003 | Franklin et al. | |
| 7,171,106 B2 * | 1/2007 | Elberbaum | 386/202 |
| 7,268,825 B2 * | 9/2007 | Ciardi | 348/512 |
| 7,533,402 B2 * | 5/2009 | Demas et al. | 725/71 |
| 2002/0152557 A1 | 10/2002 | Elberbaum | |
| 2004/0075745 A1 | 4/2004 | Mance et al. | 348/207.1 |
| 2006/0022973 A1 | 2/2006 | Alcorn et al. | 345/419 |
| 2006/0202979 A1 * | 9/2006 | Manabe et al. | 345/204 |

FOREIGN PATENT DOCUMENTS

| | | |
|---|---|---|
| GB | 2414852 | 12/2005 |
| GB | 2 415 852 | 1/2006 |

OTHER PUBLICATIONS

Kimura et al., "A Multi Function CCD Timing Generator LSI with 3-PLL Synchronization," International Conference on Consumer Electronics, 1996 Digest of Technical Papers, ICCE, Rosemont, New York, Jun. 5-7, 1996, p. 26.

Official Action, European Patent Application No. 09712396.2, 9 pages, May 18, 2011.

* cited by examiner

VIDEO SYNCHRONIZATION SYSTEM

TECHNICAL FIELD

The present disclosure relates generally to video camera systems. Particularly, this disclosure relates to video camera systems in a multi-view environment.

BACKGROUND

Video data is often captured by using multiple video cameras to produce a stereoscopic output. Particularly, video data is often captured using at least two cameras, one for the left frame and one for the right frame. In other embodiments, video data may also be captured via a stereo video camera having two sensors, one sensor for the left eye and one for the right eye. In this embodiment, both sensors may be configured to capture video with the left and right lenses separated by a fixed or variable amount of space between the lenses. Post-production equipment may be used to synchronize together the left and right frames or sensors, from multiple cameras or from a single camera, in order to create stereo video.

The synchronization of the left and right frames or sensors of the video data is a technique known as genlocking. The genlock technique is a method for synchronizing a video source with a specific reference signal or for synchronizing multiple video sources together (e.g., a set of video cameras synchronized to a common clock signal). The general objective of the genlock technique is to establish the coincidence of the signals in time at a combining point for the video sources. Particularly, the reference signal provides a reference clock signal for the video sources by phase locking the video sources to the reference video synchronization data of the reference video signal. In a general application of this technique, genlocking may be used to synchronize as few as two isolated video sources so that both sources reference a common clock signal. Nevertheless, the genlock technique may be employed for either stereoscopic or non-stereoscopic output. For example, in one embodiment, the genlock technique may be employed to synchronize multiple non-stereo video cameras of participants to a video conference. In another embodiment, the genlock technique may be employed to synchronize multiple stereo video cameras for capturing and broadcasting video footage of a sporting event.

SUMMARY OF THE INVENTION

In one embodiment, a method for synchronizing a plurality of video signals received from one or more video sources is provided. The method includes providing one or more video sources and providing a codec including an internal reference oscillator. The method also includes generating a plurality of horizontal and vertical synchronization pulses based on the reference frequency of the internal reference oscillator, generating a composite synchronization pulse based on the plurality of horizontal and vertical synchronization pulses, and transmitting the composite synchronization pulse to the one or more video sources via a communication link. The method further includes separating the composite synchronization pulse back into the plurality of horizontal and vertical synchronization pulses, generating a pixel clock signal for the one or more video sources based on one or more of the plurality of horizontal and vertical synchronization pulses, and genlocking the one or more video sources based on the generated clock signal.

In another embodiment, a system including a codec having an internal reference oscillator and a microprocessor is provided. The internal reference oscillator has a reference frequency, and the microprocessor is configured to generate a plurality of horizontal and vertical synchronization pulses based on the frequency of the internal reference oscillator. The video synchronization system further includes a switching circuit configured to generate a composite synchronization pulse based on the plurality of horizontal and vertical synchronization pulses, at least one or more video sources configured to receive the composite synchronization pulse from the switching circuit, and an electronic control system configured to produce a pixel clock signal to genlock the at least one or more video sources.

In one embodiment, a system including one or more video sources and a codec having an internal reference oscillator is provided. The internal reference oscillator includes a reference frequency. The system also includes means for generating a plurality of horizontal and vertical synchronization pulses based on the reference frequency of the internal reference oscillator and means for generating a composite synchronization pulse based on the plurality of horizontal and vertical synchronization pulses. The system further includes means for transmitting the composite synchronization pulse to the one or more video sources, means for separating the composite synchronization pulse back into the plurality of horizontal and vertical synchronization pulses, means for generating a pixel clock signal for the one or more video sources based on one or more of the plurality of horizontal and vertical synchronization pulses, and means for genlocking the one or more video sources based on the generated clock signal.

DETAILED DESCRIPTION

Figure 1:
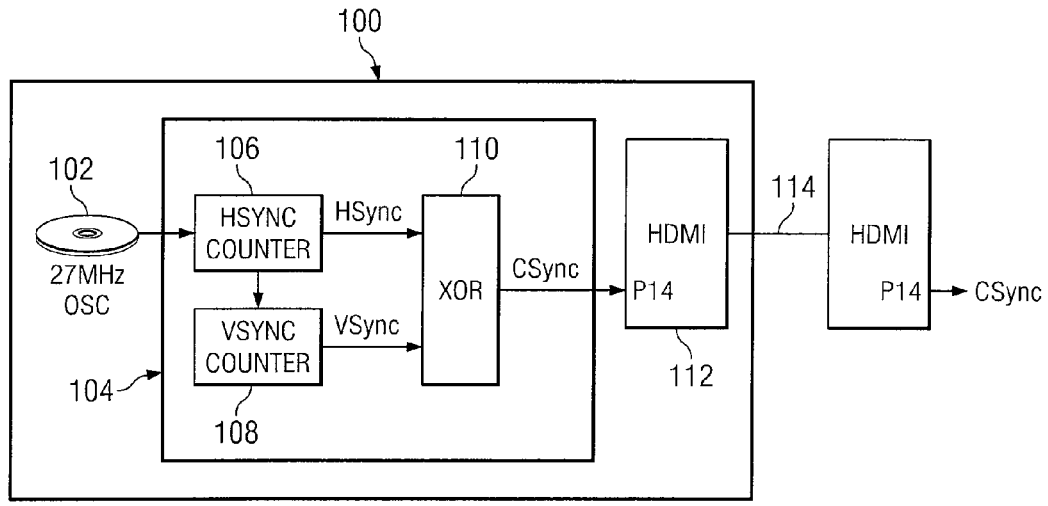
FIG. 1 illustrates a block diagram of an embodiment of a codec device.

FIG. 1 illustrates an embodiment of codec 100, also referred to as a compressor-decompressor or a coder-decoder. In this embodiment, codec 100 is configured to be coupled to a video source, such as a camera or multiple sensors within a camera, for encoding a digital data stream, such as a composite synchronization (CSYNC) signal, being sent to the video source. Codec 100 may be configured to include internal reference oscillator 102 and a field programmable gate array (FPGA) 104. In particular embodiments, internal reference oscillator 102 is located on the system board of codec 100. Internal reference oscillator 102 may operate at a frequency of 27 MHz+/−20 parts per million (PPM); however, other suitable frequencies may be used as desired. FPGA 104 of codec 100 uses the reference clock of internal reference oscillator 102 and generates horizontal synchronization pulses (HSYNC) and vertical synchronization pulses (VSYNC), which are output via HSYNC counter 106 and VSYNC counter 108, respectively. Oscillator 102 preferably counts 1 to 2,200 pixels in a line and then generates an HSYNC signal via HSYNC counter 106. VSYNC counter 108 typically counts 1,125 lines in a frame and then generates a VSYNC signal.

Vertical synchronization is a synchronization technique of frame changes in the video display with the vertical interval. The vertical interval is known as the time difference between the last line of one frame and the beginning of the next frame. In many common displays, the frame buffers are designed to match that of the typical cathode ray tube (CRT) characteristics of drawing images from the top down one line at a time by replacing the data of the previous frame in the buffer with that of the next frame in a similar manner. The technique of vertical synchronization is employed in order to prevent the phenomenon of page tearing, wherein the previously rendered frame overlaps a newly rendered frame such that the lines of the two frames do not line up correctly. Vertical synchronization is intended to minimize or eliminate this issue of page tearing by timing the frame buffer fields to coincide with the display's data request, therefore ensuring that only whole frames are displayed on a display screen.

Similarly, horizontal synchronization is a technique for scanning horizontally on a display screen. For example, in a video display environment, a horizontal synchronization pulse is transmitted when the display should begin scanning a new line.

FPGA 104 of codec 100 employs a set of stored logic with HSYNC and VSYNC counters (106, 108), in order to get a composite synchronization pulse (CSYNC). Particularly, the logic may be configured as a digital switching circuit, such as exclusive-or gate (XOR) 110. XOR gate 110 performs an exclusive-or operation on the HSYNC and VSYNC signals in order to form the CYSNC signal. The CSYNC signal is configured to be sent to an external video source 200 from codec 100 on communication link 114. Connectors (112, 202) are coupled to communication link 114 in order to interface communication link 114 to codec 100 and to video source 200. Connectors (112, 202) may be any connectors capable of or commonly employed for transmitting and receiving video data over communication link 114. Communication link 114 may be configured as a transmission cable or any other cable capable of or commonly employed for transmitting and receiving video data, such as an HDMI cable or a DVI cable. In one embodiment, the CSYNC pulse is configured to be transmitted via an HDMI cable and in particular embodiments over unused pin #14 of the HDMI cable. In another embodiment, the CSYNC pulse is configured to be transmitted via a DVI cable and in particular embodiments over unused pin #8 of the DVI cable. In yet another embodiment, communication link 114 is a wireless communication link configured as an wireless interface between codec 100 and to video source 200.

Figure 2:
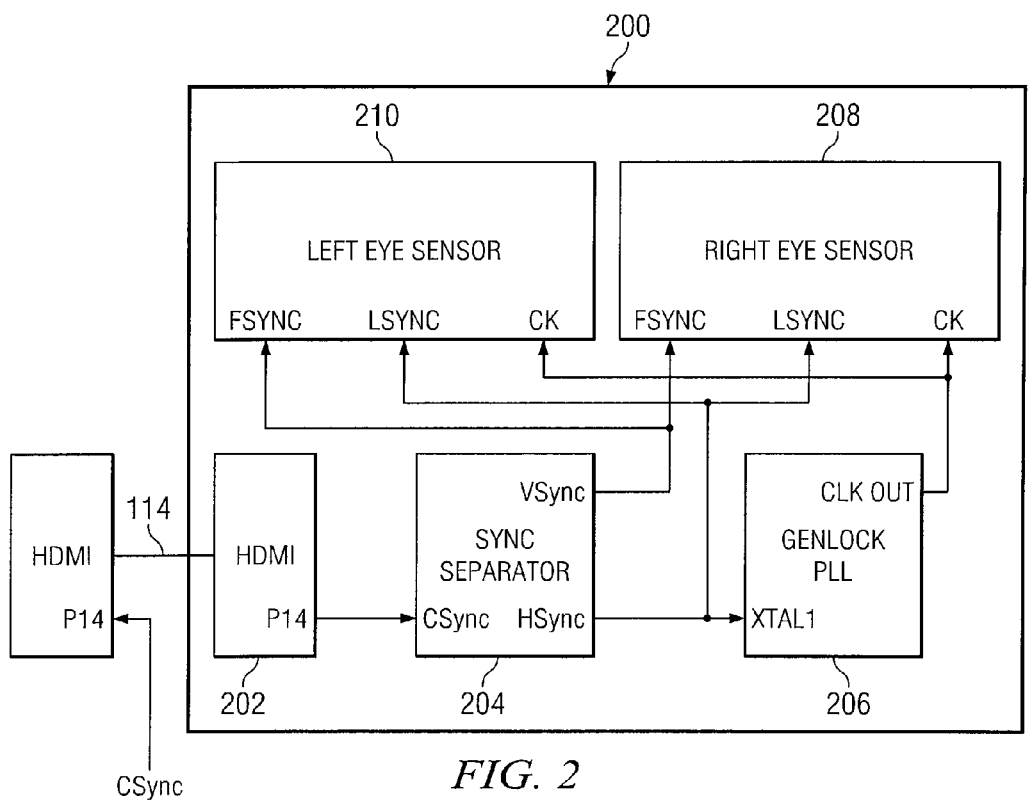
FIG. 2 illustrates a block diagram of a video source configured to be coupled to the codec device of FIG. 1.

FIG. 2 illustrates video source 200 receiving the CSYNC pulse over communication link 114. As stated above, video source 200 may include one or more cameras having one or more sensors. Particularly, video source 200 includes right eye sensor 208 and left eye sensor 210, and further includes sync separator 204. As shown in FIG. 2, the CSYNC pulse is input into sync separator 204. Sync separator 204 is configured to separate the CSYNC signal into the separate HSYNC and VSYNC components. One such embodiment of a sync separator is the Intersil EL1883. Such a sync separator is configured to provide composite synchronization (CSYNC), vertical synchronization (VSYNC), and horizontal synchronization (HSYNC) outputs. Sync separator 204 outputs a VSYNC signal and an HSYNC signal. The VSYNC signal provides the frame synchronization signal for the video source, while the HSYNC signal provides the line synchronization signal for the video source. The VSYNC signal is subdivided and coupled to right eye sensor 208 and left eye sensor 210 of video source 200, and the HSYNC signal is also subdivided and coupled from sync separator into the right eye and left eye sensors (208, 210). The HSYNC signal is also input into a phase locked loop for genlocking the right eye and left eye sensors (208, 210). Genlock phase locked loop 206 generates the clock signal for the video source and feeds the clock signal to both the right eye and left eye sensors (208, 210). One such embodiment of an eye sensor is the Altasense sensor. Phase lock loop 206 uses the HSYNC signal as a reference clock to generate the pixel clock for the right and left eye sensors (208, 210). In one embodiment, multiple video sources 200 may each be coupled to a dedicated sync separator 204 and phase lock loop 206 for genlocking the multiple video sources 200. In another embodiment, multiple video sources 200 may be configured to share a common sync separator 204 and phase lock loop 206 for genlocking the multiple video sources 200. One such embodiment of a phase lock loop is the ICS 1522. As will be understood by one skilled in the art, video source 200 is configured to use the extracted copies of the HSYNC signal, the VSYNC signal, and the pixel clock to read the left and right eye sensor data. The lenses are genlocked together based on the reference clock received from the CSYNC signal of codec 100. As will also be understood by one skilled in the art, the genlock technique may be employed with both stereo and non-stereo video sources, as previously described herein.

In another embodiment, codec 100 may be configured to be coupled with inputs for multiple stereo or non-stereo cameras for a multi-view application. In such an embodiment, the multiple cameras may be maintained in genlock by codec 100, which supplies the reference CSYNC signal. In a multiple camera environment, codec 100 may be configured to be coupled with multiple cameras, in either a parallel or serial configuration, in order to provide the CSYNC signal to multiple cameras to allow them to operate based on a common reference clock. For example, multiple cameras may be coupled together via codec 100 in order to capture a sporting event (e.g., baseball, football, etc.) from various angular views. In yet another embodiment, multiple cameras may be coupled together in a video conference setting, with a common reference signal, in order for a video conference participant to communicate with other conference participants without experiencing latency in the video communication.

Figure 3:
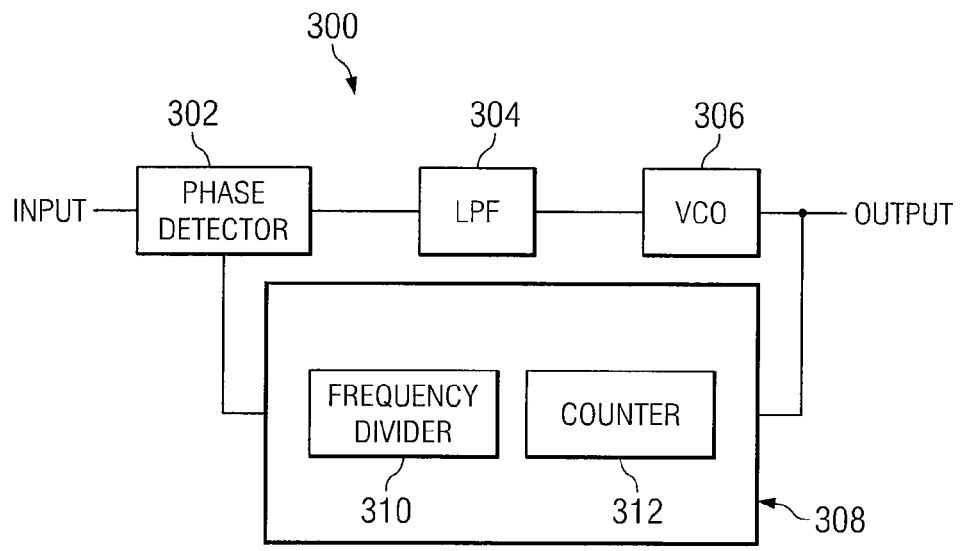
FIG. 3 illustrates a block diagram of a phase lock looped circuit, as in the video source of FIG. 2.

In FIG. 3, a phase lock loop circuit is shown in greater detail. The phase lock loop circuit responds to both the frequency and the phase of the input signal wherein it may be configured to automatically increase or decrease the frequency of a control oscillator until it is matched to the reference signal with respect to both frequency and phase. Phase lock loop 300 generates a signal that has a fixed relationship to the phase of the reference signal. In this embodiment, the generated signal is the clock signal and the reference signal is the HSYNC signal. As shown in FIG. 3, phase lock loop 300 includes phase detector 302, filter 304, voltage controlled oscillator 306, and feedback path 308. Feedback path 308 may include frequency divider 310 and counter 312. As shown in FIG. 3, two inputs may be coupled to phase detector 302. The inputs are the reference input and the feedback signal from the feedback path. The output of phase detector 302 controls the voltage control oscillator 306, such that the phase difference between the two inputs is held constant making it a negative feedback system. The output of phase detector 302 is coupled to the input of low pass filter 304. Low pass filter 304 is configured to pass low frequency signals and attenuate the amplitude of higher frequency signals above the predetermined cutoff frequency. The output of low pass filter 304 is coupled to voltage control oscillator 306. Voltage control oscillator 306 is configured to be controlled in oscillation frequency by a voltage input. For low-frequency voltage control oscillators, frequency varying methods, such as varying the charge rate of a capacitor, are typically used for frequency variation. The output of voltage control oscillator 306 is fed back to the input of phase detector 302 through frequency divider 310 and counter 312. Phase lock loop 300 uses frequency divider 310 in order to generate a frequency that is a multiple of the initial reference frequency.

Figure 4:
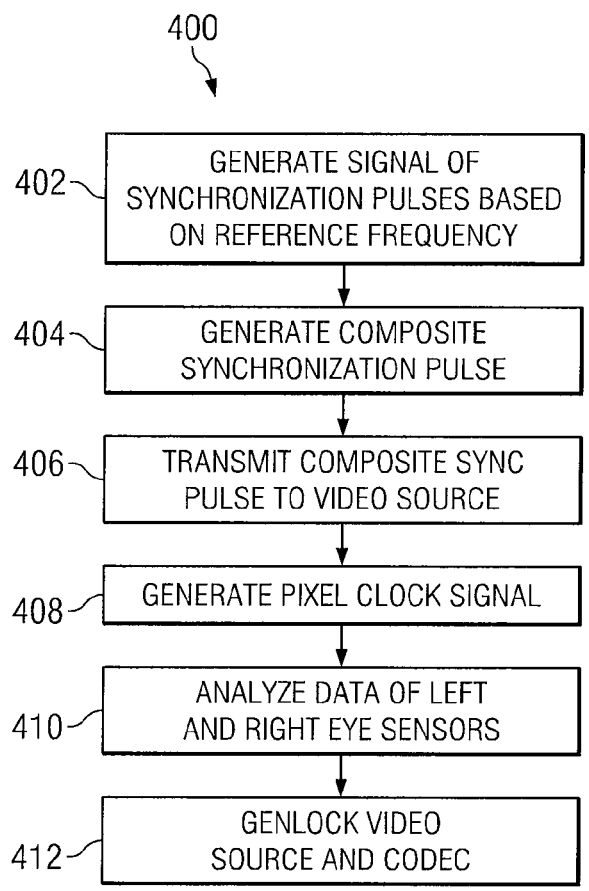
FIG. 4 illustrates an example method for synchronizing a plurality of video signals from a video source.

FIG. 4 illustrates a general example method for synchronizing a plurality of video signals from one or more video sources. At step 402, a codec generates a plurality of synchronization pulses based on the reference frequency of an internal reference oscillator. At step 404, an FPGA or other processor applies stored logic to the plurality of synchronization pulses, wherein the logic is configured to generate a composite synchronization pulse. At step 406, the codec transmits the composite synchronization pulse to one or more video sources. For example, the video source(s) could include a phase lock loop associated with the video source(s) configured to generate a pixel clock signal, as shown in step 408. At step 410, the video source(s) analyze data from the left and right eye sensors. As will be understood by one skilled in the art, the video source(s) is configured to use the extracted copies of the HSYNC signal, the VSYNC signal, and the pixel clock in order to read the left and right eye sensor data. At step 412, the video sources, or the lenses of a video source, are genlocked together based on the reference clock received from the CSYNC signal of the codec.

In one embodiment, codec 100 or video source 200 may be coupled to a user interface having an output display, one or more knobs, pushbuttons, tactile user inputs, which facilitate controlling various system functions. The user interface may be configured to display data related to the control of the video data synchronization. In one exemplary embodiment, output display may be a touch screen display, while in other exemplary embodiments, may be any other display technology type (e.g., LCD, DLP, plasma, CRT) or configuration. The knobs, pushbuttons, or tactile user inputs may be configured to control various functions relating to synchronization of video data.

In another embodiment, codec 100 and video source 200 may be configured to transmit and receive a composite synchronization signal via a wired or wireless medium, as stated above. In one exemplary embodiment, codec 100 may be configured to establish a wireless communication link such as via Bluetooth communications protocol, an IEEE 802.11 protocol, an IEEE 802.16 protocol, IEEE 802.20 protocol, a mobile device signal, an RF signal, an infrared signal, or any other suitable wireless technology. In another exemplary embodiment, codec 100 may establish a wired communication link such as with HDMI, DVI, USB, optics, or other serial or parallel port technology, or any other suitable wired link.

A component of codec 100 may include any suitable arrangement of switching circuits for logical operations. Logic performs the operations of the component, for example, by executing instructions to generate output from input. Logic may include hardware, software, or embedded logic component or a combination of two or more such components, where appropriate, according to particular needs. Certain logic, such as a processor, may manage the operation of a component. Examples of a processor include one or more computers, one or more microprocessors, one or more applications, other logic, or a combination of any suitable technology.

While exemplary embodiments are illustrated in the Figures and described above, it should be understood that these embodiments are offered by way of example only. Accordingly, the present innovation is not limited to a particular embodiment, but extends to various modifications that nevertheless fall within the scope of the appended claims. The order or sequence of any processes or method steps may be varied or re-sequenced according to alternative embodiments.

Describing the innovation with Figures should not be construed as imposing on the invention any limitations that may be present in the Figures. The present innovation contemplates methods, systems and program products on any machine readable media for accomplishing its operations. The embodiments of the present innovation may be implemented using an existing computer processors, or by a special purpose computer processor for an appropriate system, incorporated for this or another purpose or by a hardwired system.

As noted above, embodiments within the scope of the present innovation include program products comprising machine-readable media for carrying or having machine-executable instructions or data structures stored thereon. Such machine readable media an be any available media which can be accessed by a general purpose or special purpose computer or other machine with a processor.

It should be noted that although the diagrams herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the invention. Likewise, software implementations of the present innovation could be accomplished with standard programming techniques with rule based logic and other logic to accomplish the various connection steps, processing steps, comparison steps and decision steps.

The foregoing description of embodiments of the innovation has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the innovation and its practical application to enable one skilled in the art to utilize the innovation in various embodiments and with various modifications as are suited to the particular use contemplated.

What is claimed is:
1. A method comprising:
providing one or more remote video sources;
providing a codec including an internal reference oscillator, the internal reference oscillator having a reference frequency;
generating a plurality of horizontal and vertical synchronization pulses based on the reference frequency of the internal reference oscillator;
generating a composite synchronization pulse based on the plurality of horizontal and vertical synchronization pulses;
transmitting the composite synchronization pulse to the one or more remote video sources via a communication link;
separating the composite synchronization pulse back into the plurality of horizontal and vertical synchronization pulses;

generating a pixel clock signal for the one or more remote video sources based on one or more of the plurality of horizontal and vertical synchronization pulses;

genlocking the one or more remote video sources based on the generated clock signal.

2. The method of claim 1, wherein the one or more remote video sources are configured to include left and right eye sensors.

3. The method of claim 1, wherein the codec and the one or more remote video sources are configured to be coupled via an HDMI cable.

4. The method of claim 1, wherein the codec and the one or more remote video sources are configured to be coupled via a DVI cable.

5. The method of claim 1, wherein the codec operates at a frequency of 27 MHz.

6. The method of claim 1, wherein the step of generating a composite synchronization pulse further includes applying the horizontal and vertical synchronization pulses to an XOR logic gate to generate the composite synchronization pulse.

7. The method of claim 1, wherein the codec is configured to be coupled to a plurality of remote video sources in parallel.

8. The method of claim 1, wherein the codec is configured to be coupled to a plurality of remote video sources in series.

9. A system, comprising:
a codec including an internal reference oscillator and a microprocessor, the internal reference oscillator having a reference frequency and wherein the microprocessor is configured to generate a plurality of horizontal and vertical synchronization pulses based on the frequency of the internal reference oscillator;
a switching circuit configured to generate a composite synchronization pulse based on the plurality of horizontal and vertical synchronization pulses;
a communication link configured to transmit the composite synchronization pulse from the switching circuit;
at least one or more remote video sources configured to receive the composite synchronization pulse via the communication link; and
an electronic control system configured to produce a pixel clock signal to genlock the at least one or more video sources.

10. The system of claim 9, wherein the one or more remote video sources are configured to include left and right eye sensors.

11. The system of claim 9, wherein the codec and the one or more remote video sources are configured to be coupled via an HDMI cable.

12. The system of claim 9, wherein the codec and the one or more remote video sources are configured to be coupled via a DVI cable.

13. The system of claim 9, wherein the codec operates at a frequency of 27 MHz.

14. The system of claim 9, further comprising a user interface operable to genlock the one or more video sources.

15. The system of claim 9, wherein the codec is configured to be coupled to a plurality of remote video sources in parallel.

16. The system of claim 9, wherein the codec is configured to be coupled to a plurality of remote video sources in series.

17. The system of claim 9, wherein the switching circuit comprises an XOR logic gate.

18. The system of claim 9, wherein the electronic control system comprises a phase-locked loop circuit.

19. A system comprising:
one or more remote video sources;
a codec including an internal reference oscillator, the internal reference oscillator having a reference frequency;
means for generating a plurality of horizontal and vertical synchronization pulses based on the reference frequency of the internal reference oscillator;
means for generating a composite synchronization pulse based on the plurality of horizontal and vertical synchronization pulses;
means for transmitting the composite synchronization pulse to the one or more remote video sources;
means for separating the composite synchronization pulse back into the plurality of horizontal and vertical synchronization pulses;
means for generating a pixel clock signal for the one or more video sources based on one or more of the plurality of horizontal and vertical synchronization pulses;
means for genlocking the one or more remote video sources based on the generated clock signal.

20. The system of claim 19, wherein the one or more remote video sources are configured to include left and right eye sensors.

* * * * *